US00RE38808E

(19) United States
(12) Reissued Patent
Schuchman et al.

(10) Patent Number: US RE38,808 E
(45) Date of Reissued Patent: Oct. 4, 2005

(54) CELLULAR POSITIONING SYSTEM (CPS)

(75) Inventors: Leonard Schuchman, Potomac, MD (US); Ronald Bruno, Arlington, VA (US); Aaron Weinberg, Potomac, MD (US); Lloyd Engelbrecht, The Sea Ranch, CA (US)

(73) Assignee: ITT Manufacturing Enterprises, Inc., Wilmington, DE (US)

(21) Appl. No.: 10/230,104

(22) Filed: Aug. 29, 2002

Related U.S. Patent Documents

Reissue of:
(64) Patent No.: 6,111,538
Issued: Aug. 29, 2000
Appl. No.: 08/393,312
Filed: Feb. 23, 1995

U.S. Applications:

(63) Continuation-in-part of application No. 08/363,773, filed on Dec. 23, 1994, now Pat. No. 5,604,765.

(51) Int. Cl.[7] ..... G01S 1/08; G01S 5/02; H04B 7/185

(52) U.S. Cl. ..... 342/357.12; 342/361; 342/386; 342/464; 340/7.2

(58) Field of Search ..... 342/386, 464, 342/361, 357.09, 357.1, 357.12; 455/456, 422.1; 340/7.2

(56) References Cited

U.S. PATENT DOCUMENTS 4,232,317 A 11/1980 Freeny, Jr.
4,309,769 A * 1/1982 Taylor, Jr. ..... 375/139
4,882,694 A 11/1989 Brubaker et al.
5,056,106 A * 10/1991 Wang et al. ..... 375/130
5,159,608 A * 10/1992 Falconer et al. ..... 375/130
5,235,633 A 8/1993 Dennison et al.
5,309,474 A 5/1994 Gilhousen et al.
5,379,320 A * 1/1995 Fernandes et al.
5,420,592 A * 5/1995 Johnson
5,497,395 A 3/1996 Jou
5,604,765 A 2/1997 Bruno et al.
5,701,328 A 12/1997 Schuchman et al.

FOREIGN PATENT DOCUMENTS

JP 403134715 A * 6/1991 ..... G01S/5/02

* cited by examiner

*Primary Examiner*—Gregory C. Issing
(74) *Attorney, Agent, or Firm*—Edell, Shapiro & Finnan, LLC

(57) ABSTRACT

Positioning system for locating a mobile body comprising a plurality of earth based spread spectrum (SS) broadcasting stations arranged geographically in a cellular pattern. Each SS broadcasting station include a modulator providing a channel signal structure which is substantially orthogonal with respect to adjacent stations in the cellular pattern, each channel signal including navigation beacon data including a unique beacon identification, station latitude and longitude, time_slot and phase characterizations and selected parameters of adjacent stations. In one embodiment, each modulator provides a chirped SS signal in which the navigation beacon is a frequency tone that is repeatedly swept over a selected frequency band for each station. In a further embodiment, each modulator provides a GPS like direct sequence SS signal in which the navigation beacon is a PN coded broadcast. A receiver on the mobile body receives the SS signals from at least three of the SS broadcasting stations and determines the location thereof. A fourth SS broadcasting station provides altitude CPS satellite signals can be used for timing control.

24 Claims, 8 Drawing Sheets

CELLULAR POSITIONING SYSTEM (CPS)

Matter enclosed in heavy brackets [ ] appears in the original patent but forms no part of this reissue specification; matter printed in italics indicates the additions made by reissue.

REFERENCE TO RELATED APPLICATION

This application is a continuation-in-part of application Ser. No. 08/363,773 filed Dec. 23, 1994 [now pending] *now U.S. Pat. No. 5,604,765* entitled "POSITION ENHANCED COMMUNICATION SYSTEM INCLUDING SYSTEM FOR EMBEDDING CDMA NAVIGATION BEACONS UNDER THE COMMUNICATIONS SIGNALS OF A WIRELESS COMMUNICATION SYSTEM", incorporated herein by reference.

BRIEF DESCRIPTION OF THE INVENTION

Wireless communications are rapidly augmenting conventional telephone communications. For many types of wireless calls such as 911 or calls for roadside automotive repair/towing, knowing and conveying the location of the call origin is vital. However, since most users of wireless communications are mobile, their location is typically not known and can encompass a large uncertainty region. As shown in application Ser. No. 08/363,773, assigned to the assignee hereof, there are several alternative systems for position location by mobile users, but none of these current systems are adequate for the wide variety of environments for wireless communications. By far the largest segment of mobile communications in the US is the current cellular voice system, and this system presents an opportunity to establish a cellular array of spread spectrum navigation beacons that can be used for position determination by users of cellular telephony and other public wireless services. This concept was described in the above-referenced patent application. The present invention discloses about how a set of spread spectrum navigation beacons can be uniquely designed and arranged in a cellular pattern, and how the required navigation receiver signal processing can be efficiently integrated into a cellular phone via novel application of state-of-the-art technology. As shown later herein, the cellular array of navigation beacons can be a stand-alone navigation system, or it can be co-located and integrated with an existing or future cellular communications system.

DESCRIPTION OF THE INVENTION

The object of the invention is to provide a system of spread spectrum navigation beacons arranged geographically in a cellular pattern that supports position determination at a mobile or portable cellular telephone or other wireless communications terminal.

The invention features the following:

1) In one embodiment, the use of a set of direct sequence spread spectrum signals (with properties described by time slot of operation, specific PN code, PN code phase, and carrier frequency) to comprise a cellular array of navigation beacons that is used for position location by mobile or portable terminals. The system of beacons may be a stand-alone system, or an overlay of a cellular communications system in which the beacons occupy the same spectrum as the communications system.

2) In another embodiment, the use of a set of chirped spread spectrum signals to comprise a cellular array of navigation beacons that is used for position location by mobile or portable terminals. Again, the system of beacons may be a stand-alone system, or an overlay of a cellular communication system in which the beacons occupy the same spectrum as the communications system.

3) Navigation beacons that use a common frequency and a common PN code, but are distinguished by a different phase offset of the PN code epoch relative to the 1 msec time epoch. In the terrestrial environment, a unique phase offset in the code relative to the 1 msec epoch can provide a unique signature for a navigation beacon in a local geographical region.

4) Chirped navigation beacons that use a common frequency, but are distinguished by a different phase offsets of the chirp epoch relative to the 1 msec time epoch, and different sweep rates a common frequency band. In the terrestrial environmental, a unique phase offset in the chirp relative to the 1 msec epoch can provide a unique signature for a navigation beacon in a local geographical region composed of a number of otherwise identical beacons.

5) In a cellular communications system with a cellular positioning system (CPS) overlay, the provision of the cellular system control channels to convey the navigation "almanac" to mobile and portable users. The "almanac" is comprised of the data needed to convert a set of pseudorange measurements into a position, and includes a list of the cellular broadcast locations and a characterization of the navigation beacons that are broadcast from each location.

6) The use of NVRAM for the storage of the bulk of the "almanac" data which is unchanging except insofar as the cellular system and/or its navigation beacons are modified as part of system evolution.

7) Direct Sequence Spread Spectrum (DSSS) or Chirped Spread Spectrum (CSS) navigation beacons that are uniquely characterized in a local region by their assigned signal characteristics so that data modulation of the beacons is not required for beacon identification.

8) Frequency notching in a DSSS or CSS navigation receiver to filter out the interference caused by the occupied narrow band communications channels of a cellular communications system. In the chirped spread spectrum CSS receiver, the use of signal attenuation when the chirped spread spectrum CSS signal sweeps through the occupied communications channels as a novel implementation of the frequency notch. The use of the cellular system broadcast control channels to convey knowledge of the occupied slots so that they may be notched from the receiver.

9) The fact that a common antenna and RF front end is applicable for both communications and navigation is a unique and novel feature of this invention.

10) The implementation of the cellular positioning system CPS navigation receiver/processor using time-domain and frequency-domain approaches.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
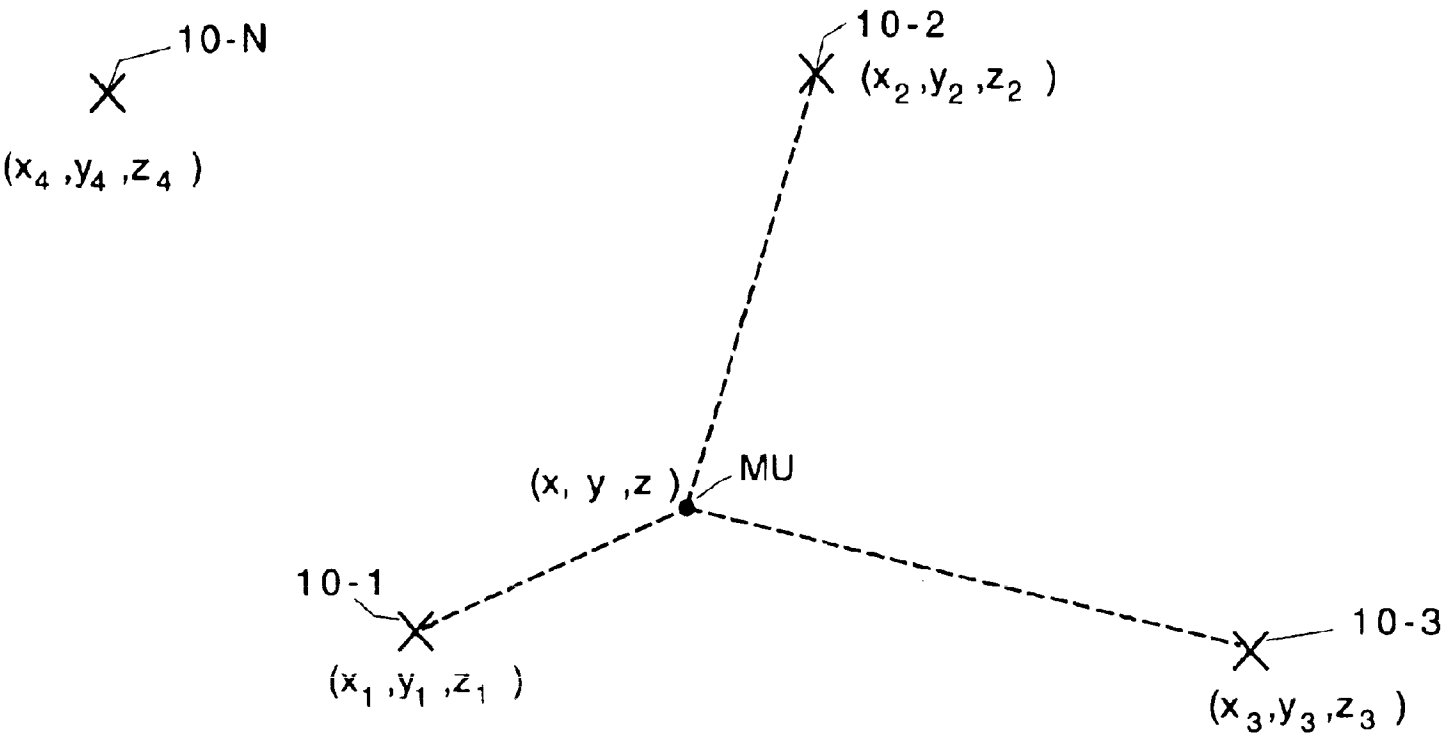
FIG. 1 illustrates a mobile terminal taking pseudo-range measurements to three base stations.
Figure 4A:
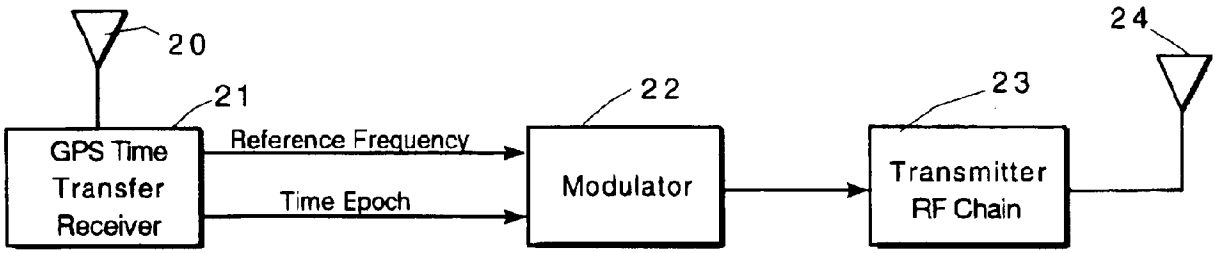
FIG. 4A is a general block diagram of a stand alone base station used in this invention.
Figure 4B:
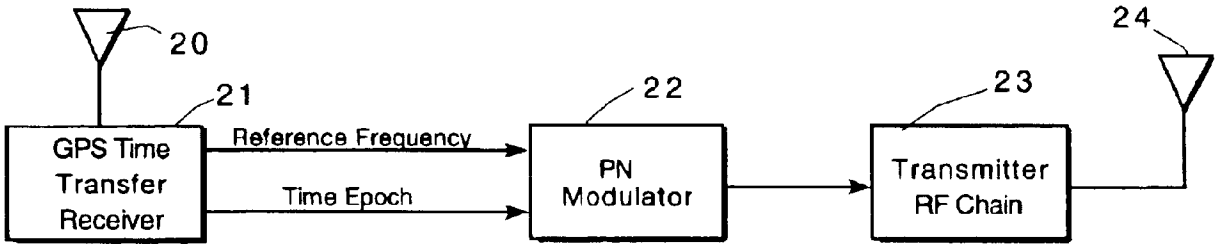
FIG. 4B is a block diagram of a direct sequence spread spectrum (DSSS) embodiment base station used in this invention.

The system is illustrated in FIG. 1 which shows a mobile user MU surrounded by base stations 10-1, 10-2, 10-3 . . . 10-N of a cellular positioning/communications system. At any point in time, the mobile unit MU tracks the navigation signals from at least 3 base stations and measures the pseudorange to each of them by processing their navigation beacons. Measurements from three base stations are required for a 2D solution and if a 3D solution is desired, then measurements from 4 base stations are required. This positioning system is referred to as the Cellular Positioning System (CPS). In the cellular positioning system (CPS), each cellular base station (BS) broadcasts a spread spectrum navigation beacon (NB) whose frequency and timing are synchronized and slaved to GPS. The system of beacons may be a stand-alone system (FIG. 4A), or an overlay of a cellular communication system (FIG. 4D) in which the beacons occupy the same spectrum as the communications system. In such an overlay system, the power of the spread spectrum signals described below can be set sufficiently low so as not to interfere with the communications channels, yet sufficiently high to support a good signal for a navigation receiver. Two types of spread spectrum navigation signals are disclosed herein:

1) A GPS-like direct sequence spread spectrum (DSSS) signal in which the navigation beacon is a PN coded broadcast (see FIG. 4B). One example code has a length of 1023 and a code period of 1 msec so that the chipping rate of the navigation beacon is 1.023 Mcps. The resulting signal is spread over about 2 MHz of spectrum. Depending upon the detailed cellular positioning system (CPS) design, the navigation beacon signal may have a different code length and chipping rate, and may support little or no data.

Figure 4C:
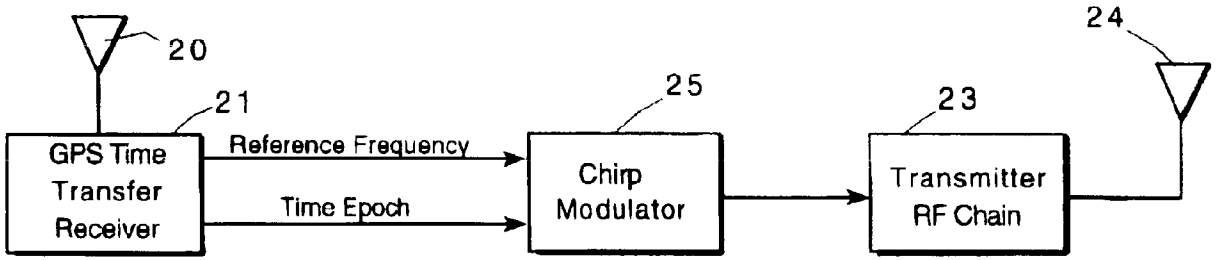
FIG. 4C is a block diagram of a chirped spread spectrum (CSS) embodiment base station used in this invention.
Figure 4D:
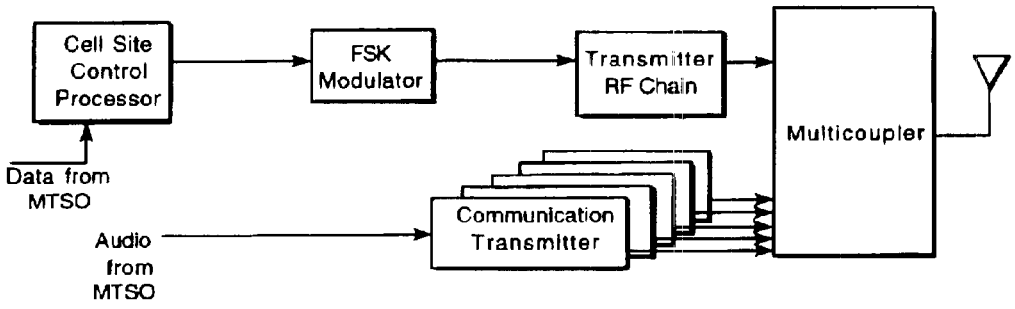
FIG. 4D is a block diagram of a cellular base station to which the navigation beacon signals of FIGS. 4A, 4B and 4C has been added.

2) A chirped spread spectrum (CSS) signal in which the navigation beacon is a frequency tone that is repeatedly swept over a chosen frequency band (see FIG. 4C). A 10 MHz band with a period of 1 msec or greater are example parameters for a chirped signal. Depending upon the chosen CPS design, chirp navigation beacon signals may also incorporate different frequencies, sweep size and sweep rate, and may support little or no data.

According to this invention, an efficient set of navigation beacons for a cellular positioning system CPS must conform to a channel structure that supports orthogonal or near orthogonal beacons that do not significantly interfere with each other. The degree of orthogonality is important since within a cellular array of navigation beacons, when a user is near a cellular BS, the navigation beacon signal power from that station may be 30 dB or more stronger than the power of navigation beacon signals from far (i.e., adjacent) BSs. With complete orthogonality, the strong navigation beacon will never interfere with a weak navigation beacon. Complete orthogonality is needed to solve the near-far interference problem in the cellular positioning system CPS. With less than complete orthogonality, however, the near-far interference is a problem whenever the near signal power is some threshold number of dB stronger that far navigation beacon signal.

In a cellular positioning system CPS, the same channels can typically be reused for beacons over a wide geographic region because range attenuation effectively provides separation between distant beacons that are using the same channel. Current and proposed cellular communications systems use frequency division, time division, code division and data/tone markers to create distinct channels. The DSSS navigation beacons in a cellular positioning system CPS similarly can use frequency, time, code and data to distinguish them from each other. In general, each individual DSSS navigation beacon is characterized by the parameters in Table 1.

TABLE 1

| Parameters of DSSS Navigation Beacons | |
|---|---|
| time_slot of operation: | for example, each NB may be on for ⅓ second every second. The time_slot would thus be 1, 2 or 3, indicating which part of a 1 second frame the NB is broadcasting in. A scheme of 3 times slots supports a 3-fold orthogonality that is complete and therefore sufficiently robust to solve the near-far problem. Schemes employing as few as 1, and as many as 7 time slots are practical and feasible in a CPS. |
| chosen PN code: | one of the library of PN codes with good cross correlation properties. Different PN codes provide a partial orthogonality that is roughly proportional to the spreading gain (which is defined as the receiver signal averaging time divided by the chip time duration). Thus for an NB with a 1.023 Mcps chipping rate supporting 50 bps of data, the spreading gain is about 43 dB which means the signal power of a strong signal interferer is suppressed by 43 dB |
| phase of the PN code: | the phase of the PN code at the msec time epochs. NP signals may use the same PN codes but broadcast the codes with sufficient phase offset to provide good orthogonality. The code phase of the NB may be in-phase (i.e., with the first chip aligned to the 1 msec time epoch) or out-of-phase (i.e., delayed by some specified number of chips so that the nth chip is aligned to the 1 msec epoch) A 1023 chip code will provide roughly 60 dB separation (1023 × 1023) between two NBs with a different code phase (when averaged over one code cycle and the frequencies of the NBs at the receiver are coherent over the code cycle period). If the frequencies are not coherent, then the orthogonality that is achieved is roughly the same as for two different PN codes. A PN code with a period of 1 msec provides a substantial amount of range ambiguity resolution in the terrestrial environment. For example, if a PN code phase is offset ½ the code period (0.5 msec) with respect to a reference code, the code phase can resolve up to 75 km of range ambiguity; thus if the two PN codes are broadcast from towers that are closer than 75 km, each signal can be resolved distinguished from the other. The use of more than two code phases states for signals will provide proportionately less capability to resolve the range ambiguity. |

TABLE 1-continued

| Parameters of DSSS Navigation Beacons | |
|---|---|
| frequency of the NB: | Each NB occupies about 2 MHz of spectrum since the bandwidth between the first nulls of an unfiltered 1.023 Mcps signal is 2.046 MHz. In a system where multiple signals are used for the NBs the nulls of a central frequency are good candidates for addition NB frequencies. The 1st null results in a completely orthogonal NB as long as the frequencies are coherent over the receiver signal integration time. Even if the frequencies are not coherent, NBs at the 1st, 2nd, 3rd and other nulls can achieve 30–60 dB or more of separation by appropriate filtering. |
| unique ID of the NB: | Each NB may support 8–16 bits of data which will be a unique identifier of that NB in the local cellular region. |

The chirped spread spectrum CSS navigation becomes in a cellular positioning system CPS similarly can use frequency, time, sweep phase, sweep rate, and data to distinguish them from each other. The characterization parameters in a system of chirped navigation beacons are described in Table 2 below. There is much commonalty with the DSSS navigation beacons but there are some significant differences that are noted.

TABLE 2

| Parameters of Chirped Navigation Beacons | |
|---|---|
| time_slot of operation: | same as for DSSS Navigation Beacons; chirps occupying different time slots are completely orthogonal. |
| chirp sweep rate: | Different sweep rates of chirped signals is one form of distinct modulation that can provide good orthogonality; for example, two chirped signals that occupy the same frequency and time slot, but with chirp period of 1 msec and 2 msec respectively. |
| phase of the chirp: | the phase of the chirp at the msec time epcohs. NB signals may broadcast the same chirp but with sufficient phase offset to provide good orthogonality. The chirp phase of the NB may be in-phase (i.e., with the frequency minimum aligned to the 1 msec time epoch) or out-of-phase (i.e., delayed by some specified amount of time). Chirp signals that differ by a constant phase offset are orthogonal. |
| frequency of the NB: | roughly the same as for the DSSS; chirps at different frequencies are completely orthogonal. |
| unique ID of the NB: | Each NB may support 8–16 bits of data which will be a unique identifier of that NB in the local cellular region. |

Figure 2:
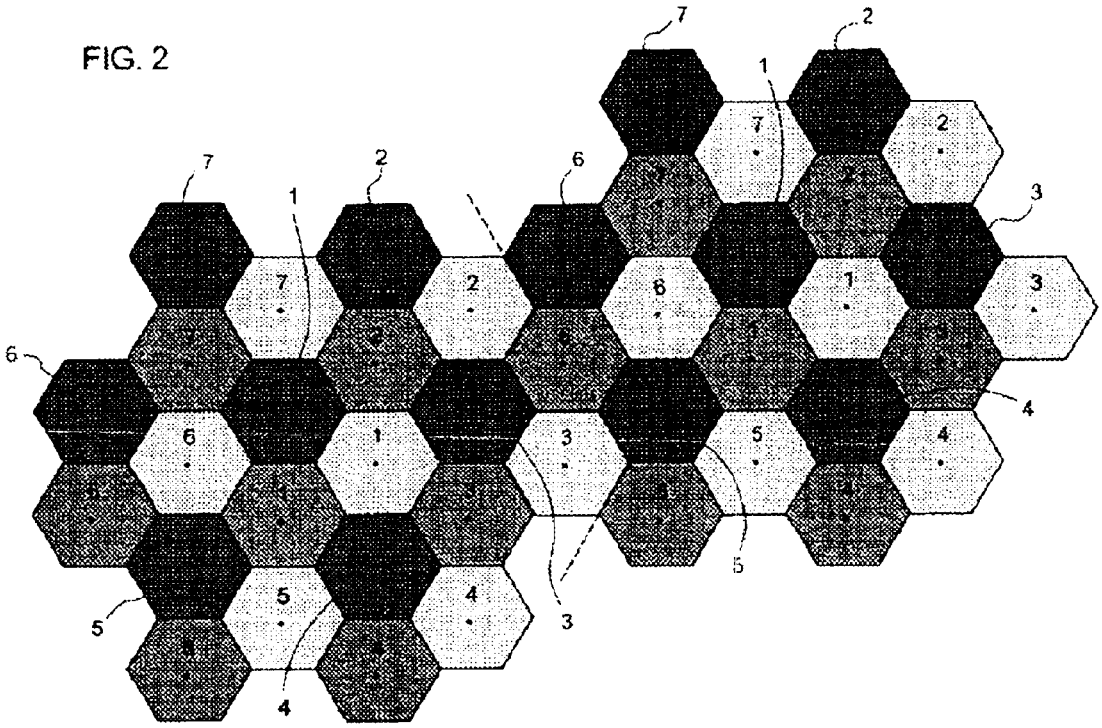
FIG. 2 illustrates a hexagonal array of base stations covered by three orthogonal navigation beacons (NB) represented by different shades of gray and seven PN codes (or seven phases of a single PN code) which is represented by the numbers (1,2,3 . . . 7) in the array.

While the above parameters in Tables 1 and 2 apply to the most general cellular positioning system CPS, in any specific application, the use of this parameter set can be limited to a subset that fills out the defined cells with navigation beacons with suitable signal characteristics that uniquely define them (in a local region) and solve the near-far interference problem. In order to solve the near-far problem in a hexagonal cellular array, it is necessary to have at least 3 navigation beacon signals that are virtually completely orthogonal (i.e., separable by at least 60 dB) under all circumstances. Of the set of DSSS parameters listed above, only time-slot and frequency satisfy this requirement. While they do not support complete orthogonality, the parameters of PN code and code phase, serve to uniquely identify the navigation beacon in a local region without having to read a unique ID that may be modulated onto each navigation beacon. Table 3A illustrates a sample of DSSS navigation beacon signal sets that satisfy the orthogonality requirements to both solve the near-far interference problem and uniquely identify the navigation beacon in its local environment. Note that the value define 21 distinct navigation beacon signals that are suitable for allocation across a hexagonal array of cells. As illustrated in the cellular positioning system CPS in FIG. 2, the hexagonal array is covered by allocating the 3 orthogonal navigation beacon signals over the array (represented by the different shades of gray) and 7 PN codes (or 7 phases of a single PN code) which is represented by the numbers in the cellular array. The 3 different shades can be viewed as either 3 orthogonal time slots or 3 orthogonal frequencies. In this manner a group of 21 cells is formed and is replicated repeatedly to fill any cellular array. Note that in these systems, the separation distance between navigation beacons with the same signal parameters is quite large (roughly 9 cell radii).

TABLE 3A

| Alternative Systems of DSSS Navigation Beacons | | | | |
|---|---|---|---|---|
| | Solve Near-Far Interference | | Provide Unique Signature | |
| System | time slots | frequencies | PN codes | PN phases |
| A | 3 | 1 | 1 | 7 |
| B | 1 | 3 | 1 | 7 |
| C | 3 | 1 | 7 | 1 |
| D | 1 | 3 | 7 | 1 |

As indicated in Table 3A, many other combinations are possible for the specification of a set of navigation beacons. Clearly, the variety of options for parameters of time_slot, frequency, PN code, and PN phase ensure that there are many sets of suitable navigation beacons that can be generated in a tailored fashion for the particular cellular layout and constraints on frequency availability and other signal parameters. In an analogous fashion, the parameters of Table 2 that characterize the chirped navigation beacons can be exercised to generate a suitable set of unique beacon signals for any reasonable cellular layout.

TABLE 3B

| Alternative Systems of CSS Navigation Beacons | | | | |
|---|---|---|---|---|
| | Solve Near-Far Interference | | Provide Unique Signature | |
| System | time slots | frequencies | chirp phase | chirp rates |
| A | 3 | 1 | 7 | 1 |
| B | 1 | 3 | 7 | 1 |
| C | 1 | 1 | 21 | 1 |
| D | 1 | 1 | 7 | 1 |
| E | 1 | 1 | 7 | 2 |

Figure 3:
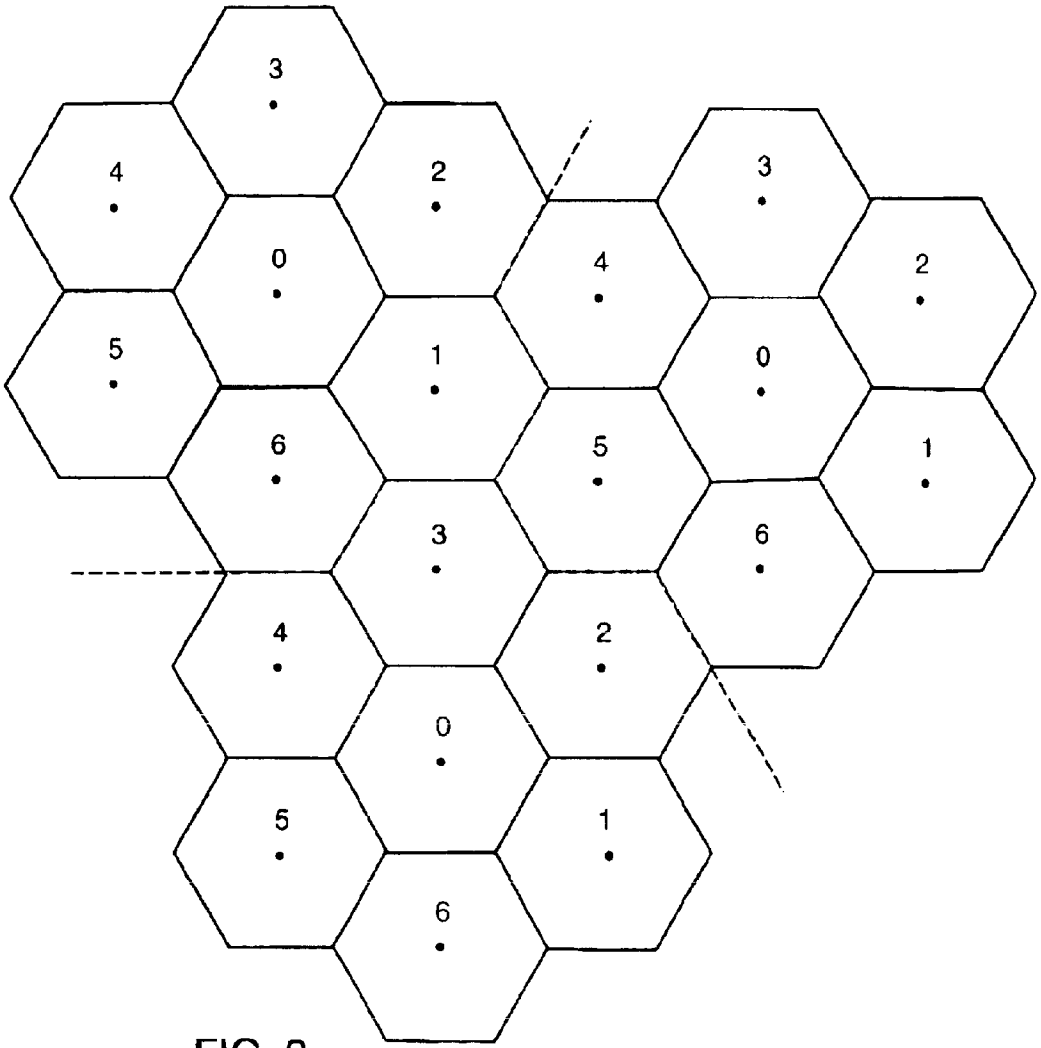
FIG. 3 illustrates a cellular positioning system of seven navigation beacons (NBs) that cover a hexagonal region of cells having seven chirp phases of a single chirped signal.

Table 3B illustrates a sample of CSS navigation beacon signal sets that satisfy the orthogonality requirements for solving the near-far interference problem and for uniquely identifying the beacons in their local environment. For three systems (A–C), 21 distinct navigation beacons are defined, for one system (D), only seven are defined, and for one (E) fourteen are defined. Note that for chirp signals, chirps of different phase are orthogonal. Thus different phases alone solve the near-far interference problem, and so in two systems (C and D), the navigation beacons are defined only by a distinct phase of the chirp. FIG. 3 illustrates the allocation of 7 distinct chirp phases (as in System D of Table 2) over a hexagonal array. The seven phases are assigned to seven hexagons of a local cluster, and this pattern is replicated to fill an entire coverage area. In general, it can be shown that in a system of beacons distinguished only by chirp phase the following constraint must be satisfied in choosing the number of phase states and the period of the chirp for a given cellular coverage area:

$$\frac{D \cdot n}{c \cdot \tau} < 1$$

where

D=the diameter of cells n=the number of distinct phase slates

τ=the period of the chirp, and c=the speed of light 3.0 Operational Scenarios of CPS Utilization 3.1 A Stand-Alone CPS A cellular positioning system CPS can be a stand-alone system, or part of a cellular communications system or a combination of stand-alone stations and cellular sites with a positioning signal. In a stand-alone system (FIGS. 4A–4C), the position is determined at a navigation receiver (NR) by acquiring, tracking and demodulating the navigation beacons. Accordingly, in a stand-alone system, all the navigation data required for position determination is broadcast by the navigation beacons. An example of the data that would be conveyed by each navigation beacon is illustrated in Table 4. Note that this information conveys the position of the BS as well as the signal parameters of the navigation beacon that is broadcast by that BS.

TABLE 4

| BS Navigation Beacon Data |
|---|
| Unique BS/Beacon ID |
| Station Latitude (1 meter quantization) |
| Station Longitude (1 meter quantization) |
| Station Altitude (1 meter quantization) |
| Time_Slot and Code_Phase and/or other characterization of NB) |
| Selected Parameters of NBs of adjacent BSs |

In order to determine position, a navigation receiver NR needs to acquire and measure the pseudorange on at least 3 navigation beacons for a 2D solution (time plus lat/lon), and at least 4 navigation beacons for a 3D solution (time plus lat/lon/alt). In addition, the navigation receiver NR would also have to demodulate the data on each of the navigation beacons. When the navigation receiver NR has measured the required number of pseudoranges and has read the data on each navigation beacon, the position of the navigation receiver NR can be solved for. Excess measurements can be used to generate added measurement precision and robustness via standard techniques for minimization of measurement variance and elimination of out of bounds measurements. The typical scenario for position determination for a stand-alone cellular positioning system CPS is as follows:

Step 1: At navigation receiver NR turn-on, the navigation receiver NR searches the signal parameter space, acquires the first navigation beacon, and measures the pseudorange. The navigation receiver NR then reads the data on the navigation beacon.

Step 2: With or without the aid of the data from the first acquired navigation beacon, the navigation receiver NR continues a search for subsequent navigation beacons from other BSs. The navigation receiver NR continues until it makes a pseudorange measurement and acquires the data from at least two additional navigation beacons broadcast from adjacent BSs.

Step 3: The navigation receiver NR computes a 2D or 3D position, depending upon the number of navigation beacons acquired and processed.

Step 4: The navigation receiver NR continues to acquire and track navigation beacons as the navigation receiver NR may move though the geographic region that is covered by the cellular positioning system CPS, and it periodically recalculates the navigation receiver NR position according to some defined algorithm.

3.2 A CPS Embedded in a Cellular Telephone System

In a cellular positioning system CPS that is integrated with a cellular communications system, the navigation beacons may share the same spectrum as the communications systems (as described in the above-referenced patent application). In addition, much or all of the required navigation data may be conveyed by the broadcast control channels of the communications system. Thus, in a cellular positioning system CPS integrated with a communications system the data supported by each navigation beacon is minimal: at most an 8–16 bit identifier that is unique with in the local cellular region. The rest of the navigation data needed is transmitted by the cellular control channels that are broadcast from each cellular BS. The scenario for position determination in this combined communications-navigation system is described below via the operation of a cellular phone and a phone navigation receiver NR. For illustration purposes, the set of navigation beacon signals illustrated as System A in Table 3A is assumed.

Step 1. Comm Initialization via Listening to the Cellular Control Channel: At the start of this scenario, the phone is just turned on. The phone searches for, finds and listens to a cellular communications control channel and initializes itself according to the applicable cellular communications standard or protocol.

Step 2. Nav Initialization via Listening to the Cellular Control Channel: In listening to the control channel, the phone also initializes with respect to cellular navigation. When this task is complete, the phone has determined that it is near a specified base station, and has acquired the lat/lon/alt/code_phase/time_slot for all the base stations in the local environment. This data is conveyed via navigation overhead messages that are broadcast on each control channel; these overhead messages contain a data set as illustrated in Table 4, but also include the data for all of the adjacent cellular BSs as well as an issue number that will change with cell system evolution, and the spectral occupancy of communications channel broadcast by the BS. This information will be stored in non-volatile random access memory (NVRAM) (FIG. 5) so that the data is preserved from call to call. The NVRAM is of sufficient size so the IDs and locations of a reasonable sized region of cells can be stored. Every time the phone is in an initialization state, the NVRAM is updated so that the NVRAM always stores the most current broadcast of the cellular navigation parameters. Thus, in making a call for which position is desired, the parameters of the local navigation beacons will be known (assuming that the received "issue number" in the navigation data matches the "issue number" of the data stored in NVRAM for that cellular base station). If the received unique ID and issue number do not both match a value stored in NVRAM, then the navigation data would need to be collected before the positioning call could proceed. As the phone explores new territory, the list of cell base station locations would expand to fill the NVRAM. For a phone that covers a great deal of territory, new locations would be written over old locations whenever the capacity of the NVRAM is reached. This navigation data that is stored in the NVRAM is referred to as the navigation almanac.

Step 3. Search and Acquisition of a Navigation Beacon (NB): This step can be done in parallel with Step 1 and Step 2. Every cellular base station transmits a navigation beacon with a set of signal parameters designated in the communication broadcast control channel. The navigation receiver NR of the phone searches various time slots and code phase states for a navigation beacon that is strong enough to acquire the PN code and possibly to read a "unique ID" that is coded onto the navigation beacon. When this task is completed, the phone navigation receiver NR has made a pseudorange measurement on the navigation beacon and has reached synchronization with the navigation system, meaning that it now has an absolute reference for both time_slot and code_phase. In the local environment, each navigation beacon is uniquely specified by the time_slot/code_phase pair so that additional navigation beacons can be rapidly acquired, and the identity of each navigation beacon is known a priori (thus the data on these beacons does not need to be read in order to determine the identity of the navigation beacon).

Step 4. Search and Acquisition of Other Navigation Signals:

Having achieved synchronization with code_phase and time_slot of a navigation signal in Step 3, the phone navigation receiver NR looks up (in the NVRAM) the code_phase and time_slot of other navigation beacons in the local environment, the phone navigation receiver NR then proceeds to acquire these signals and make pseudorange measurements. Note that since code_phase and time_slot uniquely specify the navigation beacon in its local environment, the data on these navigation beacons is not read. Note also that acquisition of navigation beacons in this Step may be aided by using the data on the spectral occupancy of communications channels via insertion of frequency notches in the navigation receiver NR to reduce the interference that is created by a strong communications signal (from a nearby cellular base station) on a weak navigation signal (broadcast by a distant base station). Such notching would typically be required for the AMPS and TDMA cellular systems in which the communications channels are contained in 30 KHz frequency slots that are dispersed throughout the cellular allocation. In a Q-CDMA system, such frequency notching would not be required. If pseudorange measurements on at least 2 other navigation beacons are made, the phone navigation receiver NR can proceed to Step 5.

Step 5. Calculation of Position: With a total of 3 or more pseudorange measurements, the navigation receiver NR can generate a 2D solution, solving for navigation receiver NR time and location (lat/lon). With a total of 4 or more pseudorange measurements, the navigation receiver NR can generate a 3D solution, solving for time and location (lat/lon/alt). Excess measurements can be used to generate added measurement precision and robustness via standard techniques for minimization of measurement variance and elimination of out of bounds measurements. When Step 5 is completed, the phone displays a "position fixing" indicator analogous to the roaming indicator. The "position fixing" indicator will tell the user that the phone knows its position at that particular moment in time.

Step 6. Recalculation of Position: In the idle state, the phone will continue to listen to the communications control channel. During this time, the phone navigation receiver NR may or may not (e.g., where power is scarce) continue to operate. In general, the phone navigation receiver NR will recalculate its position according to a programmed algorithm. Recalculation could be done continuously, or in response to an expired time or event as described below:

| | |
|---|---|
| continuous recalculation: | With continuous recalculation the NR stays operand and continuously recalculates its position. This algorithm would be suitable for applications that have sufficient power to support the continuous operation of the phone NR. |
| periodic recalculation: | In this mode, recalculation is initiated periodically after the expiration of a set amount of time; thus, the phone NR would normally be in a power conserving sleep mode, but would wake up periodically (e.g., every 5 minutes) in order to recalculate its position. The time interval between wake-ups would be programmed by the phone user. |
| recalc on control channel turnover: | In this mode, the NR would normally be in a power conserving sleep mode, but would wake up whenever the phone receiver changes the control channel that it listens to; this turnover in control channels occurs whenever the signal strength of the initial control channel fades down to a specified level and the phone searches for and locks onto a stronger control channel. |

4.0 Operational Scenario of CPS-Cellular Communications Coordination for Call Processing At the start of this scenario, it is assumed that the phone and phone navigation receiver NR has completed the Steps 1 to 3 that are described above. At the completion of Step 3, the phone displays a position fixing indicator that tells the phone user that the phone is ready and prepared to make a "position enhanced" (PE) phone call. The call processing that then takes place is a follows:

Step 1. Initiating the Call: The phone user initiates a PE phone call in the same manner as normal calls (nominally by dialing the number and pressing the Send key). Depending upon the way positioning service is used, the phone user may convey a desire for a PE call via the pressing of some specified key combination. For 911 calls, a PE call would be the default.

Step 2. Phone Response: In response to the user call initiation, the phone seizes the access control channel and sends a digital message in accordance with cellular system specifications. This message contains the phone electronic serial number (ESN), the user mobile phone number (MIN), and other such data. In a PE phone call, the digital message would contain an additional cellular control word that conveys the lat/lon of the phone location in accordance with a standard compressed format. For example, to convey the lat/lon of the phone (with a 10 meter quantization) relative to the lat/lon of the base station would require about 24 bits.

Step 3. MTSO Response. With the completion of Step 2, the MTSO has the location of the phone prior to call setup, and can therefore use this information in call processing. Thus, in a 911 call, the MTSO could use location knowledge to find the appropriate emergency service center for the phone location, and then route the call and the location data to that emergency service center. For PE calls other than 911, the MTSO would also send the location of the calling phone to the call destination. This can be accomplished in-band via modem (in accordance with an established standard) or out-of-band via SS7.

Step 4. Call Servicing: Call servicing of a "one-shot" positioning call proceeds the same as a normal cellular call. In response to the request by the phone, the MTSO assigns an available voice channel to the phone via a message on the control channel; the phone then switches to that channel while the MTSO proceeds to patch the call through to the dialed number. However, with "continuous" position fixing during a call, the phone navigation receiver NR must continue to measure pseudoranges on all the navigation beacons to update the location estimate of the phone. In order to do this as the phone moves through cell during the call progress, it is clear that the phone will need to continue to receive a control channel in order to maintain the navigation data it needs to acquire and track the navigation beacons. The process for a "continuous" position fixing call is described in the succeeding steps.

Step 5. Call Servicing for "Continuous" Position Fixing: In this mode, the phone navigation receiver NR must continue to receive and monitor a control channel, since the ability to position fix depends upon the navigation overhead data that is broadcast on the control channels. Thus, as phone moves through cells during a call, the phone must continue to monitor control channels and switch to a stronger one as required in order to maintain a current file of the navigation data. As it does this, the phone navigation receiver NR continues to calculate its position. Each position update may then be periodically sent to the MTSO via a specially-defined message on the voice control channel. Alternatively (or in addition), the message can be sent in-band via a simultaneous "data-in-voice" modem. The continuous monitoring of a control channel after switching to a voice channel is a departure from normal cellular telephony operations, but it is not inconsistent with such operations, and may even provide telephony benefits. For example, if the cellular telephone continues to monitor a control channel, the MTSO has a means to offer such services as "call waiting" by alerting a phone via the control channel that a call is being placed to their busy number.

Receiver Processing

Figure 5:
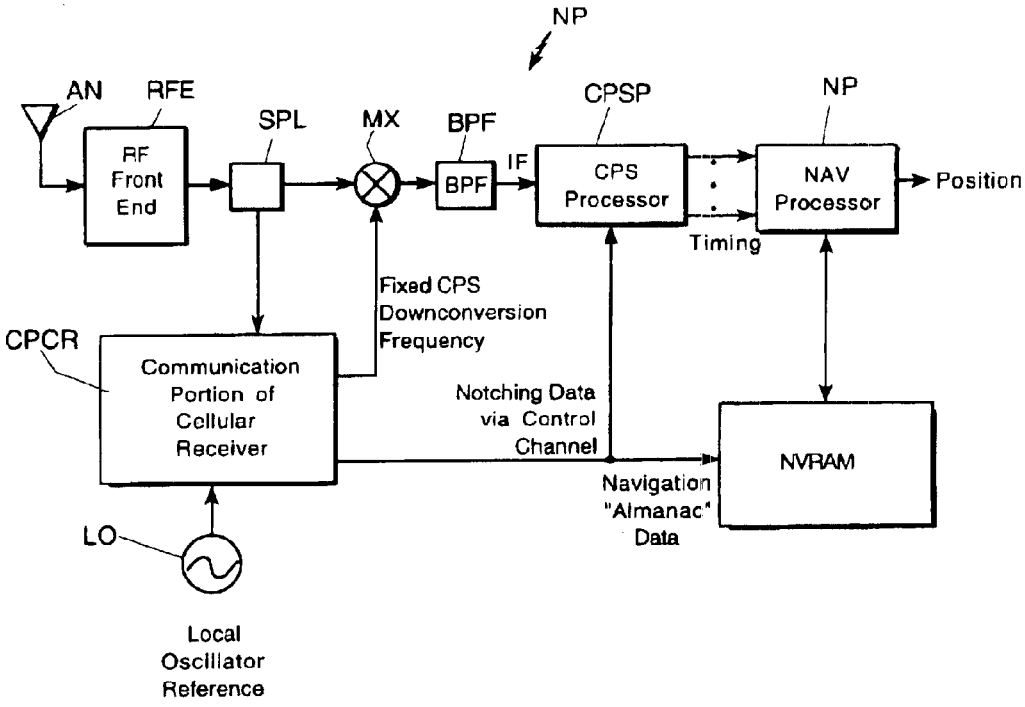
FIG. 5 is a general block diagram of a cellular position system receiver used in this invention.

This section presents a description of selected embodiments of a navigation receiver signal processor. While novel features will be explicitly identified, it should be emphasized that other embodiments would also be included as part of this invention. An overview of receiver processing, within the user's unit, is shown in FIG. 5. Note that the user's unit may be a cellular car phone, portable phone, or other receiving device that may, for example, operate in a general PCS environment. As seen in FIG. 5, the composite incoming RF signal is received by a single antenna (AN) and is amplified and conditioned by a single RF front end (RFE) (e.g., Low Noise Amplifier). It should be emphasized that the composite incoming signal, which includes the combination of communication-channel and control-channel signals, typically spans tens of MHz (e.g., >20 MHz for cellular). The fact that a common antenna AN and RF front end RFE is applicable for both communications and navigation is a unique and novel feature of this invention.

As further seen in FIG. 5, following the RF front end RFE, the signal is split SPL into two parts. One path goes to the communications/control-channel CPCR processing portion of the device, and the other path goes to the navigation portion NP of the device. In the present discussion, only the navigation portion NP of the device is described in detail, but as seen, the navigation processing requires "notching" data that is provided by the Control Channel (CC). This "notching" aspect was addressed and is expanded upon further below.

As further shown in FIG. 5, the signal output of the RF front end RFE is downconverted via mixer MX, and a single fixed downconversion frequency, to a convenient intermediate frequency (IF). While a single mixing stage is shown, this invention encompasses the m ore general case of one or multiple downconversion stages. The IF signal is filtered by Bandpass Filter BPF, whose bandwidth is approximately 2 Mhz, to accommodate the 1.023 Mcps spread spectrum signal or to an alternative bandwidth to accommodate the chirped signal.

The BPF is followed by the following unique system elements:

1. The Cellular Positioning System CPS Processor, CPSP, which is amenable to a miniaturized/low-power implementation, executes all the required signal processing functions on the chirped or PN spread-spectrum signals of interest, to enable highly accurate navigation. The outputs of the CPSP block are the relative PN code or chirp timing epochs of each of the cellular base station BS spread-spectrum signals being tracked; as discussed earlier, up to seven such signals may be tracked for a typical hexagonal cellular configuration. Also, as discussed in earlier sections, a minimum of three "high quality" signals must be tracked to enable a highly accurate 2D navigation solution. As such, considerable diversity and robustness is built into this navigation approach.

2. The timing and other data output from the CPSP is fed into the Navigation Processor block NP, which converts the relative timing information from CPSP into actual user position (e.g., latitude/longitude).

Figure 6:
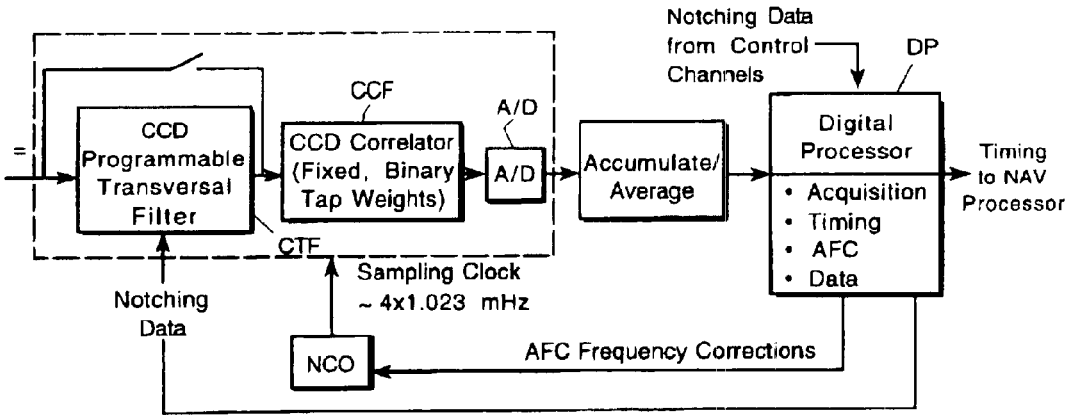
FIG. 6 is a block diagram of a cellular position system processor with PN navigation signals using a time domain approach.
Figure 7:
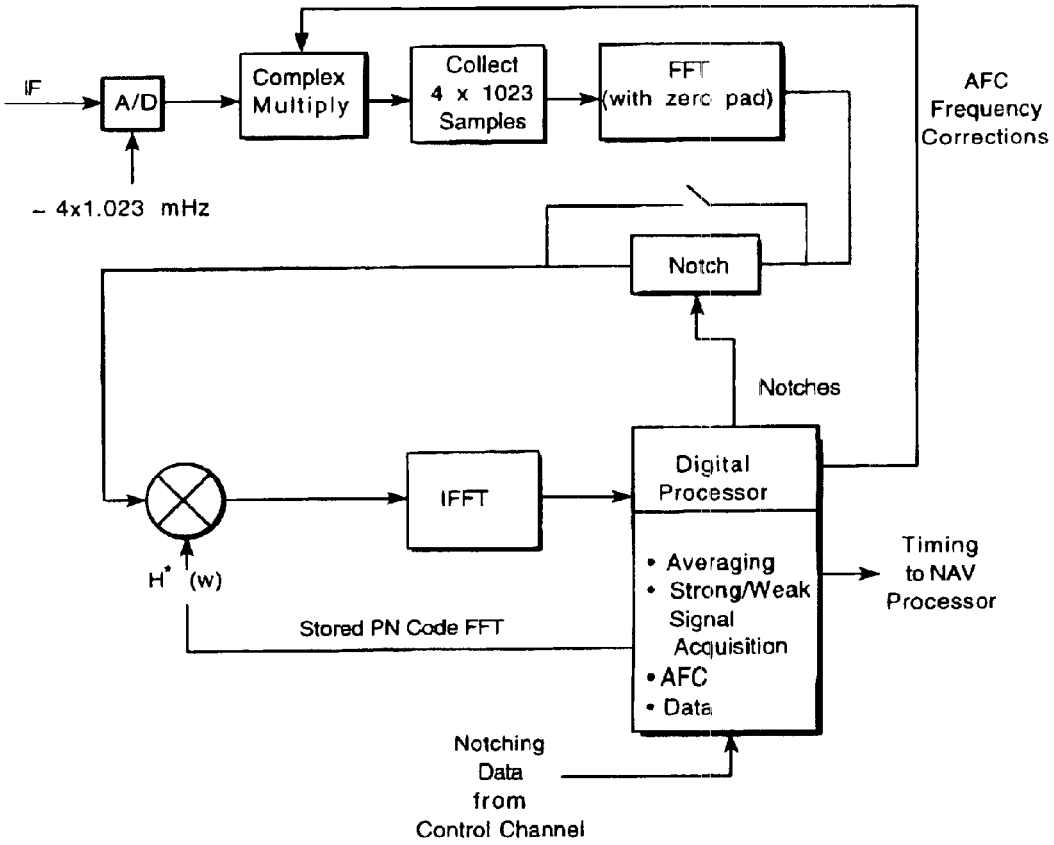
FIG. 7 is a block diagram of a cellular position system processor with PN navigation signals using a frequency domain approach.
Figure 8:
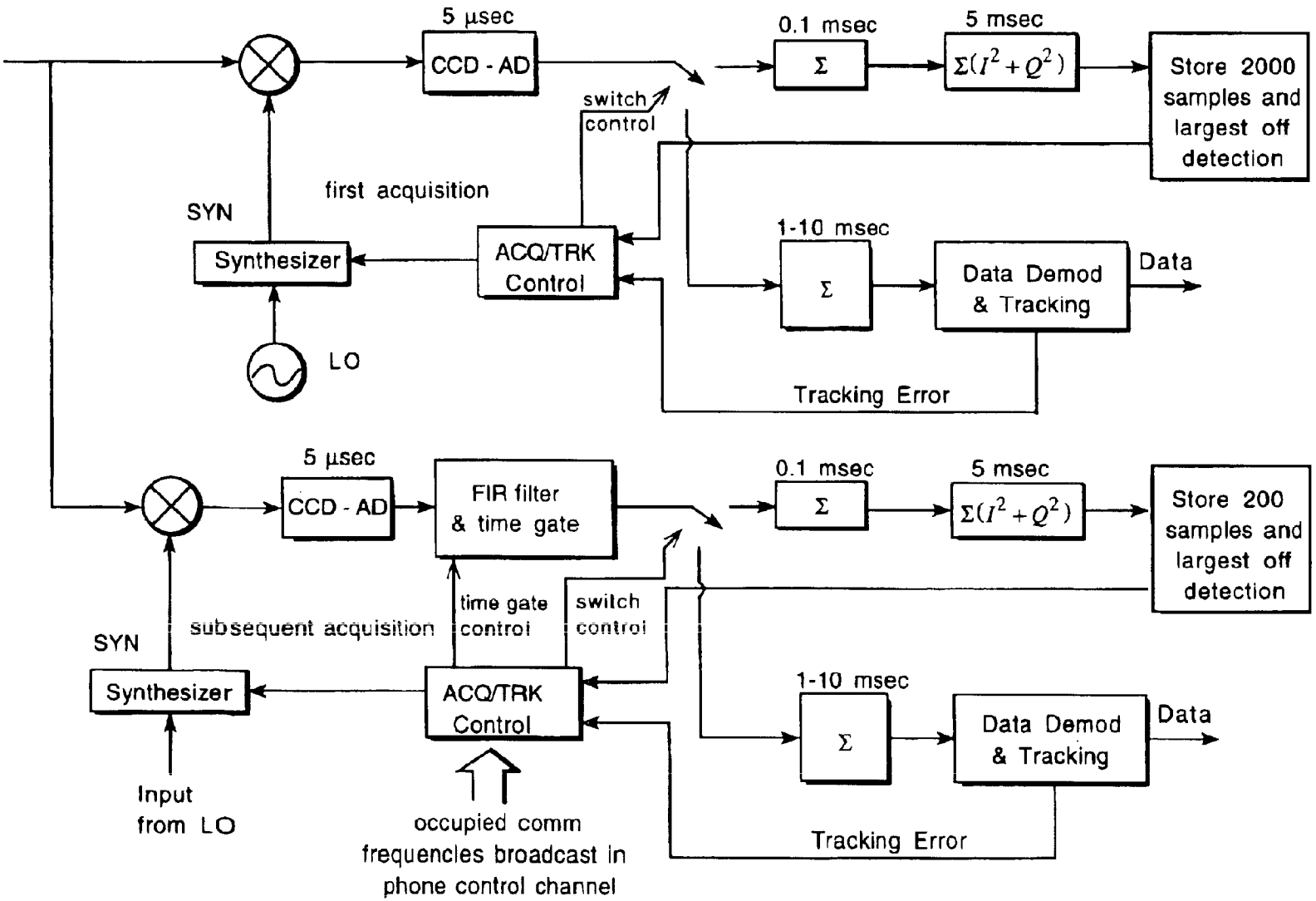
FIG. 8 is a block diagram of a cellular position system processor with chirp signals.

While several embodiments of the CPSP block may exist, two unique embodiments for DSSS navigation beacons are illustrated in FIGS. 6 and 7, respectively. In addition, one embodiment of the CPSP block for CSS navigation beacons is illustrated in FIG. 8. It should be emphasized, however, that other embodiments that may exist would also be included in this invention. Key features of each of the processing approaches are described in the following.

CPs Processor 1 (for DSSS Navigation Beacons)—Time Domain Approach using CCD Correlators The heart of the CPSP in FIG. 6 is the serial combination of the two Charge Coupled Device (CCD) blocks shown. The processing shown here is a unique application and extension of the IF sampled CCD demodulation described in the above-referenced patent and another patent application that is currently pending. The key features of this processing are as follows:

1. The IF is sampled at a carefully selected rate, so that successive samples effectively represent in-phase and quadrature baseband components. This sampling rate is (4/k)×the IF, where k is an odd integer. In other words, baseband components are generated here without the need for mixer components. Also, these operations are performed at high speed and low power consumption without A/D conversion, since the CCD is an analog device. As seen in FIG. 6, a single A/D converter is required after all CCD processing is complete. Further details are described in the above cited patent and patent application, which also discusses the significant benefits in size, power consumption, and programmable flexibility.

2. The first CCD is implemented as a programmable transversal filter, CTF, whose tap weights may be programmed with multi-bit (e.g., 8) quantization, to enable shaped filtering. In the present application, the specific CTF of interest "notches" out the high-power, narrowband communication signals that may degrade spread-spectrum signal demodulation.

a. When the user's unit is first turned on, it tunes to the cellular Control Channel (CC) designated to the BS for the cell that the user is in. For AMPS and TDMA, this represents a 30 KHz channel, while for QCDMA, the control channel is another spread-spectrum signal. For AMPS and TDMA, immediately following turn-on, the CTF shown is bypassed—i.e., the switch shown is closed—thereby precluding notching. The reason for this is that notching is not required to acquire and accurately track the spread spectrum signal transmitted by the BS that is closest to the user; this has been explicitly shown in our previous patent application (Position Enhanced Communication System Including System for Embedding CDMA Navigation Beacons Under the Communications Signals of a Wireless Communication System)). The CCD following the transversal filter is used to acquire and track the desired spread-spectrum signal this CCD is discussed further below.

b. The CTF is always bypassed for QCDMA, since notching is never needed when operating in the QCDMA spread-spectrum environment.

c. The AMPS or TDMA CC provides the CPSP with the frequencies of the communication channels employed by the BS in the user's cell, once this data is received by the CPSP, it programs the taps of the CTF to "notch" out these "strong" narrowband signals, thereby virtually eliminating the "near-far" problem. This notching remains in place as navigation processing is in progress. Furthermore, when the user moves to another cell, and the frequencies of the "strong" communication channels change, the CTF tap weights are appropriately adjusted based on data provided by the new CC designated to the user's new cell BS.

3. The CTF is followed by another CCD, CCF, that is sampled at the same rate as the CTF, CCD, CCF has fixed tap weights matched to the PN code of interest, and provides the extremely rapid PN code acquisition that is essential for applications such as 911. The uniqueness of this implementation is noted. Specifically, for the Table 3A System A of interest, a single CCD PN matched filter correlator is all that is needed to process all CPS spread spectrum signals across the entire cellular system. This is because the same PN code is transmitted by all cell BSs, with discrimination among sites being executed via the combination of the time diversity and code phase diversity described in Sections 3 and 4.

4. The CCD, CCF output is A/D converted, to enable efficient post-processing as shown. The A/D operation is advantageous here since the CCD output SNR is much higher than at the input. Furthermore, CCD technology has advanced to the point where an ultra-low power AID may be directly incorporated onto the CCD chip itself, wherein the A/D is implemented using "charge-domain" processing techniques.

5. The A/D output is averaged and algorithmically processed to determine the PN code correlation peaks—hence, their relative timings—thereby yielding the desired timing data for transfer to the Navigation Processor. As also noted in FIG. 6, the algorithmic processing of the Digital Processor, DP, further provides AFC frequency control corrections, as necessary, to compensate for offsets in the user's local oscillator. These frequency corrections are executed by suitable adjustment of the CCD IF sampling rate—another unique feature of this implementation!

CPS Processor 2 (for DSSS Navigation Beacons)—Frequency Domain Approach

A frequency domain equivalent to the above is shown in FIG. 7. In this scenario, the IF input to the CPSP is first A/D converted, and all subsequent processing is performed digitally:

1. The procedure at service turn-on is virtually identical to the time domain approach, in that the CC of the user's BS is first processed to identify the spectral locations of the "strong" communication channels associated with the user's BS.

2. For this FFT process fixed blocks of data are collected and stored at a time. In the present illustrative case, wherein the IF is sampled at four times the PN chip rate, each block of 4×1023 samples encompasses the full PN code cycle. The collected samples are then used to generate the associated FFT (zero padding may also be used, as necessary or desired for additional resolution).

3. For initial acquisition and tracking of the user BS's cellular positioning system CPS signal, no notching is required, as discussed in the time domain approach. Once locations of the "strong" signals are identified via the CC, notching is readily implemented by zeroing out the appropriate portions of the FFT.

4. PN code correlation/despreading is implemented in the frequency domain by multiplying the FFT by the complex conjugate of the FFT of the cellular positioning system CPS PN code; this complex conjugate is stored as the array II*(w).

5. The result of the multiplication is processed by an inverse FFT (IFFT) to yield the time-domain correlation function. Once this IFFT is averaged, to enhance SNR, the desired correlation peak—and, hence, the desired PN code epoch—is readily extracted. The IFFT may further be processed to yield frequency correction information, to correct for local oscillator offset, and the result fed back to the Complex Multiply block shown, CM.

6. As in the time-domain approach, for System A of Table 1, three PN code epochs are obtained from each IFFT, wherein the epochs are suitably and unambiguously spaced.

7. Because the FFT and IFFT operations are computationally intensive—especially when the length is on the order of 4000 or greater—the FFT/IFFT operations need not be performed on contiguous data. Thus, for example, a 1 ms data block (1 PN code cycle) is collected and processed over several ms, followed by additional data collection and processing. Because each FFT/IFFT encompasses three PN code epochs, this mode of operations still offers efficient acquisition and tracking at acceptable levels of computation power.

CPS Processor (for CSS Navigation Beacon)

A comparable processing chain for CSS beacons is illustrated in FIG. 8. The CSS beacons are assumed to have a period of 5 msec during which they sweep over 10 MHz of frequency. In this implementation, the key features of the signal processing are as follows:

1. The signals enter at RF and are mixed with the output of a synthesizer SYN. The synthesizer SYN produces a frequency staircase at 10 KHz steps (each lasting 5 $\mu$sec). Thus, in 5 msec (1000 stairs), the synthesizer moves over 10 MHz of frequency. The nominal intermediate frequency (IF) resulting from the mixing process is 70 MHz. In general, there will be a number of chirped navigation signals arriving at the navigation receiver, along with a number of narrowband signals of the communications system. At the outset, the navigation receiver conducts a search to first acquire a strong navigation signal. The process by which this is done is a "largest of" detection algorithm based upon a search over all phases of chirp. This process of acquisition and tracking of the first signal is described in items 2 and 3 below. The acquisition and tracking of subsequent navigation beacons is described in item 4 below.

2. During acquisition, the output of the mixing process due to a received chirped navigation beacon is a series of short chirps each with a duration of 5 usec. If the synthesizer is roughly in phase with the navigation signal, the chirps will be within 10 KHz of the 70 MHz IF. If the synthesizer is out of phase with the incoming chirped signal, the chirps after the mixing process can be up to ±MHz offset from the 70 MHz IF. The CCD sampling rate is 20 MHz and the CCD has fixed binary tap weights so that alternate output samples of the CCD are a moving sum of the in-phase (I) and quadrature (Q) components of the input signal. The moving sum over 5 μsec is essentially a low-pass filter with a first null out at 200 KHz. The output of the CCD is then sampled by the A/D stage of the receiver at 5 μsec intervals (after each frequency stair). Thus the sampling rate of the A/D for I/Q pairs is 200 KHz, and further processing by the navigation receiver is all digital.

a. Following the A/D step, the signal is further accumulated coherently for 0.1 msec which is 20 samples of the CCD; with this step, the filter bandwidth of the receiver has been collapsed down to 10 KHz to the first null. The maximum allowable time for coherent accumulation is controlled by the drift in the local oscillator (that is driving the synthesizer) relative to the incoming received navigation signal. If the local oscillator (LO) is accurate to ±1 part in a million, the relative frequency drift for a 900 MHz navigation signal will be about ±900 Hz. Over 0.1 msec, a 900 Hz offset will result in about a 30° drift in the phase of the I and Q samples. For drifts larger than this, cancellation among the accumulated samples will occur.

b. This coherent accumulation is followed by envelope accumulation for 5 msec (50 coherent accumulation intervals); this value is then dumped and stored in memory. This value stores the detection statistic for a search of an incoming chirp signal with a bandwidth that is roughly within 5 KHz of the chirp that is generated by the synthesizer.

c. At this point, the timing of the frequency staircase is advanced by 2.5 μsec and the accumulation resumes again for 5 msec; the resulting output is again dumped to memory. The effect of the 2.5 μsec advance in the phase of the synthesizer is a shift in the frequency search bandwidth of 5 KHz.

d. This process continues for 2000 iterations so that all phases of the code are explored with a quantization of 2.5 μsec in time and 5 KHz in frequency (e.g., 2000×5 KHz=10 MHz); the largest of the 200 iterations is chosen, and with this detection, the phase of the strongest chirped navigation signal has been acquired. The estimated acquisition time for this first signal is thus 2000×5 msec or about 10 seconds.

3. During tracking, the control of the synthesizer is turned over to a tracking loop. As in acquisition, the CCD output is a series of I/Q pairs at a 200 KHz rate. The DSP then implements an accumulator over a time interval of from 1 msec to 10 msec which corresponds to a tracking bandwidth of 1000 Hz and 100 Hz, respectively. The tracking accurate (Δx) is dependent upon the resolution of the frequency tracking bandwidth and is governed by the following formula:

$$\Delta x = \frac{\tau \cdot c}{F}\Delta f = 0.15\frac{\text{meters}}{\text{Hz}} \cdot \Delta f$$

where,

Δf=frequency resolution

τ=the period of the chirp=5 msec

C=the speed of light, and

F=chirp swing=10 MHz

Thus, a 100 Hz resolution corresponds to a 15 meter accuracy for the pseudorange tracking measurement. However, multipath delays of up 1 μsec (300 meters) can be expected; thus, at times this will create a broadening of the frequency on the order of 1000 Hz. Thus, it is necessary to have an adaptive tracking loop that spans the frequency band created by the multipath.

Figure 9:
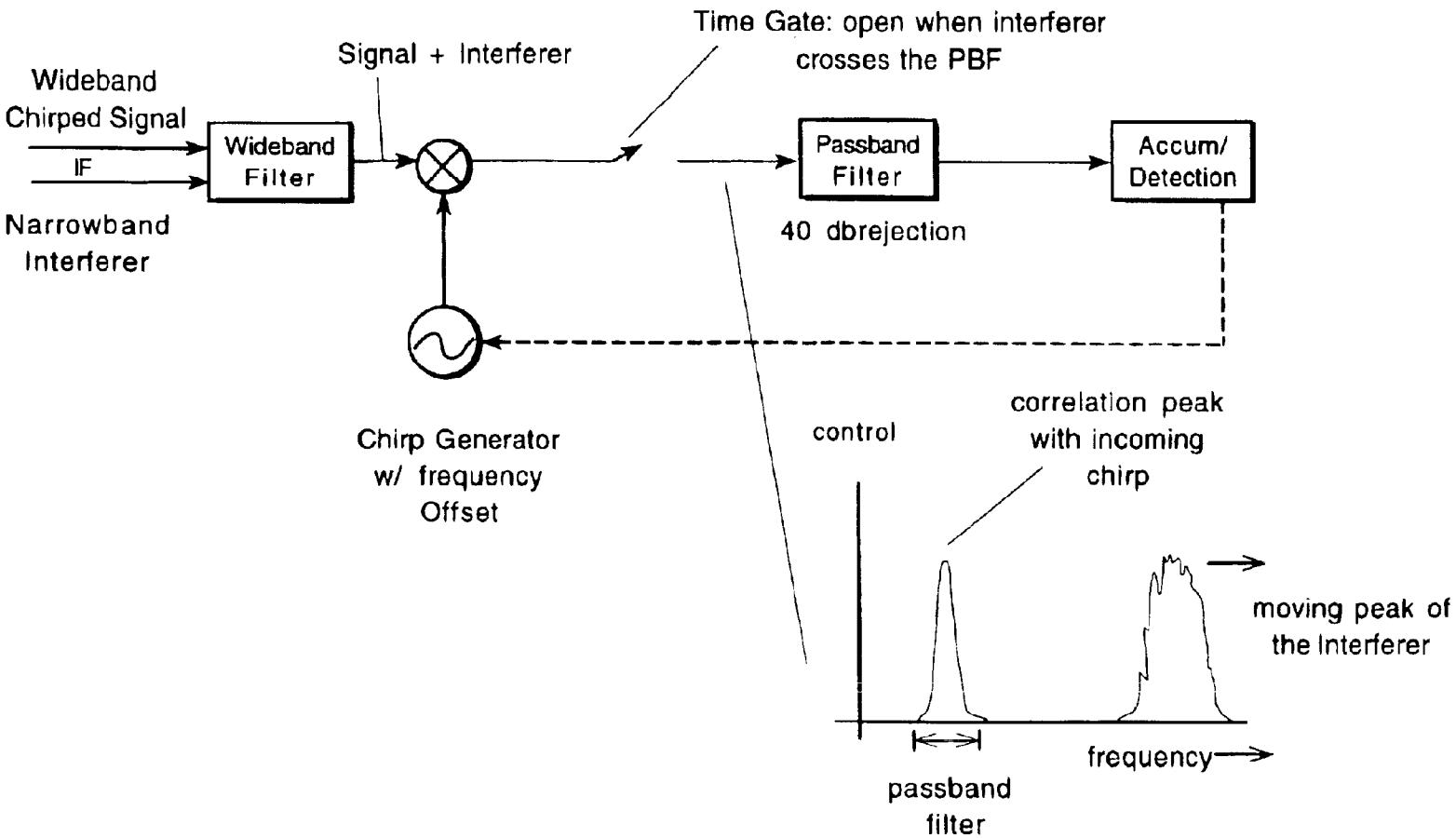
FIG. 9 is a block diagram illustrating the time-gated approach for frequency notching in a chirp receiver.

4. Upon acquisition and tracking of a first navigation signal, the parallel receiving channel in FIG. 8 begins operation. The acquisition and tracking for subsequent navigation signals is similar to that of the first navigation signal, but there are some significant differences. Firstly, with the acquisition of a first navigation signal, the search space for the chirp phase is reduced by about a factor of 10 so that subsequent acquisitions are accomplished in about 1 second. In addition, there is a reasonable chance that the subsequent navigation signals will be interfered with by strong narrowband communications signals from a nearby cell site. In this case, this interference must be mitigated by a time-gated switch that eliminates this interference by nulling out the received signal when the synthesizer passes through the occupied narrowband communications channels. In this manner, the communications channels can be attenuated by 40 dB or more, and allow the reception of much weaker navigation signals from more distant cell site. To achieve this nulling, a sliding window of FIR filter is implemented that has a sharp roll-off so that interfering signals that fall outside the band are greatly attenuated; when the interfering signals cross the FIR bandwidth, the time gate nulls out the incoming signal. Thus the FIR filter, in combination with nulling at the appropriate times, effectively and dramatically reduces the interference resulting from strong communications signals during both acquisition and tracking. This concept is illustrated in the functional receiver design shown in FIG. 9. The wideband chirped signal and the narrowband interferer from wideband filter WF are correlated in correlator COR with signals from chirp generator CG (with frequency offset) and under control of accumulator/detector ACD. An electronic switch or time gate ES is opened when the interferer crosses the passband frequency. The correlation peak of the incoming chirp and the mooring peak of the interfering signals are shown in the inset in the lower right side of FIG. 9.

SUMMARIZING THE INVENTION HAS THE FOLLOWING NOVEL FEATURES

The use of a set of direct sequence spread spectrum signals (with properties described by time slot of operation, specific PN code, PN code phase, and carrier frequency) to comprise a cellular array of navigation beacons that is used for position location by mobile or portable terminals. The system of beacons may be a stand-alone system, or an overlay of a cellular communications system in which the beacons occupy the same spectrum as the communications system.

The use of a set of chirped spread spectrum signals to comprise a cellular array of navigation beacons that is used for position location by mobile or portable terminals. The system of beacons may be a stand-alone system, or an overlay of a cellular communication system in which the beacons occupy the same spectrum as the communications system.

The use of navigation beacons that use a common frequency and a common PN code, but are distinguished by a different phase offset of the PN code epoch relative to the 1 msec time epoch. In the terrestrial environment, a unique phase offset in the code relative to the 1 msec time epoch can provide a unique signature for a navigation beacon in a local geographical region.

The use of chirped navigation beacons that use a common frequency, but are distinguished by different phase offsets of the chirp relative to the 1 msec time epoch, and different sweep rates within a common frequency band. In the terrestrial environment, a unique phase offset in the chirp relative to the 1 msec time epoch can provide a unique signature for a navigation beacon in a local geographical region composed of a number of otherwise identical beacons.

In a cellular communications system with a cellular positioning system CPS overlay, the use of the cellular system control channels to convey the navigation "almanac" to mobile and portable users. The "almanac" is comprised of the data needed to convert a set of pseudorange measurements into a position, and includes a list of the cellular broadcast locations and a characterization of the navigation beacons that are broadcast from each location.

The use of NVRAM for the storage of the bulk of the "almanac" data which is unchanging except insofar as the cellular system and/or its navigation beacons are modified as part of system evolution.

The use of DSSS or chirped spread spectrum CSS navigation beacons that are uniquely characterized in a local region by their assigned signal characteristics so that data modulation of the beacons is not required for beacon identification.

The use of frequency notching in a DSSS or chirped spread spectrum CSS navigation receiver to filter out the interference caused by the occupied narrow band communications channels of a cellular communications system. In the chirped spread spectrum CSS receiver, the use of signal attenuation when the chirped spread spectrum CSS signal sweeps through the occupied communications channels as a novel implementation of the frequency notch. The use of a cellular system broadcast control channels to convey knowledge of the occupied slots that they maybe notched from the receiver.

The fact that a common antenna and RF front end is applicable for both communications and navigation is a unique and novel feature of this invention.

The implementation of the cellular positioning system CPS navigation receiver/processor using time-domain and frequency-domain approaches.

While the invention and preferred embodiments have been shown and described, it will be appreciated that various other embodiments, modifications and adaptations of the invention will be readily apparent to those skilled in the art.

What is claimed is:

1. Positioning system for locating a mobile body comprising a plurality of earth based spread spectrum (SS) broadcasting stations arranged geographically in a hexagonal cellular pattern, each said SS broadcasting station including a modulator providing a channel signal structure which is substantially orthogonal with respect to adjacent SS broadcasting stations in said hexagonal cellular pattern, each channel signal including navigation beacon data including:

(a) a unique beacon identification, (b) station latitude and longitude, (c) time slot frequency and phase characterizations and (d) selected parameters of adjacent stations.

2. The positioning system defined in claim 1 wherein each said modulator provides a GPS like direct sequence SS signal in which the navigation beacon data is a PN coded broadcast.

3. The positioning system defined in claim 1 including receiver means for receiving the SS signals from at least three of said SS broadcasting stations and determining the location thereof.

4. The positioning system defined in claim 1 in which GPS satellite signals are received in said hexagonal cellular pattern and including means at each said broadcasting station for receiving said GPS satellite signals and deriving therefrom a reference frequency signal and a time epoch signal, said modulator means being adapted to receive said reference frequency and time epoch signals and be timed thereby.

5. Positioning system for locating a mobile body comprising a plurality of earth based spread spectrum (SS) broadcasting stations arranged geographically in a hexagonal cellular pattern, each said SS broadcasting station including a modulator providing a channel signal structure which is substantially orthogonal with respect to adjacent SS broadcasting stations in said hexagonal cellular pattern, each channel signal including navigation beacon data including:

(a) a unique beacon identification, (b) station latitude and longitude, (c) time slot frequency and phase characterizations and (d) selected parameters of adjacent stations, each said modulator providing a GPS like direct sequence SS signal in which the navigation beacon is a PN coded broadcast, and receiver means for receiving the direct sequence SS signals from at least three of said SS broadcasting stations and determining the location thereof.

6. The positioning system defined in claim 5 in which each said SS broadcasting station includes means to receive GPS satellite signals and means for deriving therefrom a reference frequency signal and a time epoch signal, said modulator means being adapted to receive said reference frequency and time epoch signals and be timed thereby.

*7. A positioning apparatus suitable for use in an earth based spread spectrum (SS) broadcasting station among a plurality of earth based spread spectrum (SS) broadcasting stations arranged geographically in a cellular pattern in a communication system for locating a mobile body, each said SS broadcasting station outputting a channel signal that is substantially orthogonal with respect to channel signals output by adjacent SS broadcasting stations in said cellular pattern, the apparatus comprising a modulator suitable to output such a substantially orthogonal channel signal including navigation beacon data including:*

*(a) a unique beacon identification,*

*(b) station latitude and longitude,*

*(c) time slot frequency and phase characterizations, and*

*(d) selected parameters of adjacent stations.*

*8. The positioning apparatus of claim 7, further comprising a time transfer receiver configured to receive GPS satellite signals and deriving therefrom a reference frequency signal and a time epoch signal, said modulator being connected to the receiver and adapted to receive and be timed by said reference frequency and time epoch signals.*

*9. The positioning apparatus of claim 7, wherein the modulator is configured to output a GPS-like direct sequence SS (DSSS) signal having the navigation beacon data that is PN coded.*

*10. The positioning apparatus of claim 9, wherein the DSSS signal output from the modulator has at least one of a PN code and a PN phase that differs from PN codes and PN phases of the channel signals output by the adjacent SS broadcast stations.*

*11. The positioning apparatus of claim 7, wherein the modulator is configured to output a chirped spread spectrum (CSS) signal as the substantially orthogonal channel signal having chirp characteristics that are different from chirp*

*characteristics of the channel signals output by the adjacent SS broadcasting stations.*

*12. The positioning apparatus of claim 11, wherein the different chirp characteristics include at least one of a chirp rate and a chirp phase.*

*13. A positioning apparatus suitable for use in a mobile body in a communication system having a plurality of earth based spread spectrum (SS) broadcasting stations arranged geographically in a pattern suitable for facilitating cellular communications, each SS broadcast station transmitting a navigation beacon that is substantially orthogonal with respect to navigation beacons transmitted from adjacent SS broadcasting stations in the cellular pattern, wherein the navigation beacons include:*

*(a) a unique beacon identification,*

*(b) station latitude and longitude,*

*(c) time slot frequency and phase characterizations, and*

*(d) selected parameters of adjacent stations,*

*the positioning apparatus comprising a receiver configured to receive said navigation beacons from at least three of said SS broadcasting stations in the communication system and determine a location of the mobile body therefrom.*

*14. The positioning apparatus of claim 13, wherein the navigation beacons transmitted by said at least three of said SS broadcasting stations are direct sequence SS (DSSS) signals having different PN characteristics, and the receiver is configured to receive such DSSS signals.*

*15. The positioning apparatus of claim 14, wherein the different PN characteristics include at least one of a PN code and a PN phase.*

*16. The positioning apparatus of claim 13, wherein the navigation beacons transmitted by said at least three of said SS broadcasting stations are chirped spread spectrum (CSS) signals having different chirp characteristics, and the receiver is configured to receive such CSS signals.*

*17. The positioning apparatus of claim 16, wherein the different chirp characteristics include at least one of a chirp rate and a chirp phase.*

*18. A method of determining a location of a mobile unit operating within a wireless communication system having a plurality of earth based broadcasting stations each transmitting a navigation beacon substantially orthogonal to navigation beacons transmitted by adjacent broadcasting stations, the method comprising:*

*detecting on a control channel of a communication signal broadcast by one of the plurality of broadcasting stations a navigation message containing information concerning the navigation beacons transmitted by the plurality of broadcasting stations;*

*acquiring the navigation beacons transmitted by at least three of the broadcasting stations using the information contained in the detected navigation message and determining from the acquired navigation beacons range measurements to said at least three broadcasting stations; and*

*determining a position of the mobile unit based on the range measurements,*

*wherein the navigation message includes identifiers of at least the adjacent broadcast stations and characteristics of the navigation beacons transmitted by the adjacent broadcast stations.*

*19. The method of claim 18, wherein characteristics of the navigation beacons transmitted by the adjacent broadcast stations include for each navigation beacon at least one of: a time slot identifier of a time slot within a communication signal in which the navigation beacon is broadcast; phase information concerning a phase of the navigation beacon; and a frequency of the navigation beacon.*

*20. The method of claim 19, wherein the navigation beacons transmitted by the adjacent broadcast stations are direct sequence spread spectrum (DSSS) signals, and the characteristics of the navigation beacons include a PN code and PN code phase.*

*21. The method of claim 19, wherein the navigation beacons transmitted by the adjacent broadcast stations are chirped spread spectrum (CSS) signals, and the characteristics of the navigation beacons include a chirp rate and chirp phase.*

*22. The method of claim 18, wherein at least one of said navigation beacons is overlaid with a communication signal, and the method further comprising processing said communication signal.*

*23. The method of claim 22, further comprising transmitting to a call destination mobile unit position information based on the determined position of the mobile unit.*

*24. The method of claim 23, further comprising transmitting with the mobile unit position information, information identifying the mobile unit.*

* * * * *